United States Patent [19]
Fukuda et al.

[11] Patent Number: 5,870,208
[45] Date of Patent: Feb. 9, 1999

[54] METHOD AND APPARATUS FOR PRINTING HIGH QUALITY STILL PICTURE FRAMES

[75] Inventors: Kyoko Fukuda; Naohisa Arai, both of Kanagawa; Tadafusa Tomitaka, Chiba, all of Japan

[73] Assignee: Sony Corporation, Tokyo, Japan

[21] Appl. No.: 872,348

[22] Filed: Jun. 10, 1997

Related U.S. Application Data

[63] Continuation of Ser. No. 411,170, Mar. 27, 1995, abandoned.

[30] Foreign Application Priority Data

Mar. 29, 1994 [JP] Japan ..................................... 6-059116

[51] Int. Cl.$^6$ ............................... H04N 1/40; H04N 7/14; H04N 7/00
[52] U.S. Cl. ........................... 358/448; 348/207; 348/22; 348/24; 348/18; 348/19; 358/404; 358/444
[58] Field of Search ..................................... 348/154, 155, 348/207, 208, 413–418, 497, 22, 24, 18, 19, 439, 429, 430; 358/448, 443, 445, 404, 444

[56] References Cited

U.S. PATENT DOCUMENTS

| | | | |
|---|---|---|---|
| 4,771,331 | 9/1988 | Bierling et al. | 358/136 |
| 4,816,915 | 3/1989 | Imai et al. | 348/715 |
| 4,924,306 | 5/1990 | Van der Meer et al. | 358/105 |
| 5,025,316 | 6/1991 | Darby | 358/701 |
| 5,162,907 | 11/1992 | Keating | 358/701 |
| 5,185,664 | 2/1993 | Darby | 358/701 |
| 5,237,405 | 8/1993 | Egusa et al. | 358/105 |
| 5,291,280 | 3/1994 | Faroudja et al. | 348/416 |
| 5,452,021 | 9/1995 | Kusaka | 348/699 |
| 5,453,800 | 9/1995 | Kondo | 348/208 |
| 5,473,441 | 12/1995 | Inuiya et al. | 348/701 |
| 5,485,224 | 1/1996 | Burns | 348/700 |
| 5,510,840 | 4/1996 | Yonemitsu | 348/416 |
| 5,526,053 | 6/1996 | Dorricolt | 348/700 |
| 5,565,922 | 10/1996 | Krause | 348/413 |

FOREIGN PATENT DOCUMENTS

| | | | |
|---|---|---|---|
| 0 070 677 | 1/1983 | European Pat. Off. | H04N 1/46 |
| 0 458 249 | 11/1991 | European Pat. Off. | H04N 5/14 |
| 0 508 706 | 10/1992 | European Pat. Off. | H04N 5/14 |
| 0 523 924 | 1/1993 | European Pat. Off. | H04N 5/14 |
| 0 544 122 | 6/1993 | European Pat. Off. | H04N 70/11 |

*Primary Examiner*—Thomas D. Lee
*Assistant Examiner*—Jerome Grant II
*Attorney, Agent, or Firm*—Frommer Lawrence & Haug LLP; William S. Frommer

[57] ABSTRACT

A method and apparatus for printing a hand motion corrected still picture frame to form a clear, high quality image. Even field and odd field data making up a still picture frame are stored in a memory. The stored frame is divided into blocks and a motion vector is detected for each block. A hand motion correction (or deviation) quantity is determined from the entirety of the detected motion vectors; and the two fields of the still picture frame are read out of the memory, corrected as a function of the deviation quantity and printed.

21 Claims, 5 Drawing Sheets

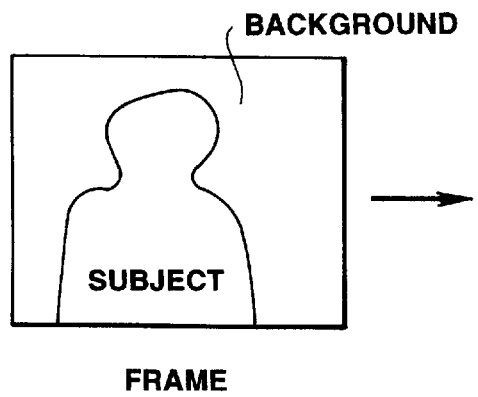
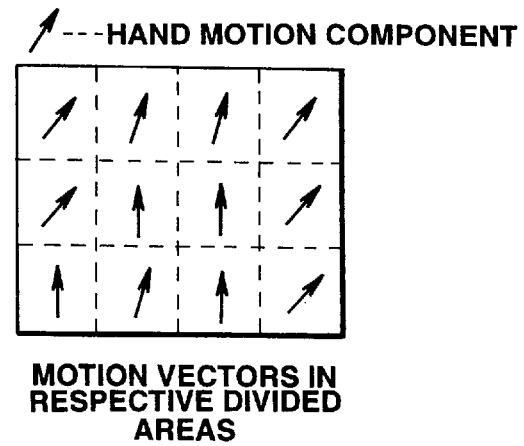
FIG.4A
FIG.4B
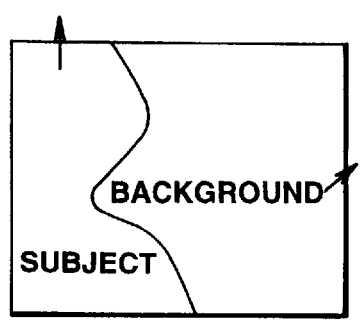
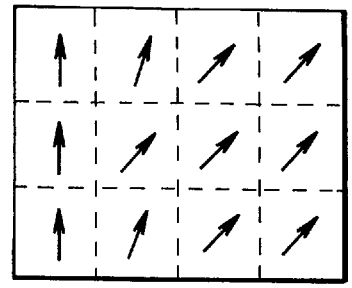
FIG.5A
FIG.5B

METHOD AND APPARATUS FOR PRINTING HIGH QUALITY STILL PICTURE FRAMES

This application is a continuation of application Ser. No. 08/411,170, filed Mar. 27, 1995, now abandoned.

BACKGROUND OF THE INVENTION

This invention relates to a device for printing high quality frame still pictures from externally input video signals. Differences between the two fields which constitute the frame still picture are compensated to produce a clear hard copy image of the still picture frame.

To make a hard copy of an image, a picture printing device is connected to an external device such as a color television, an image pickup device, a video recorder, a personal computer or the like. The picture printing device stores video information input from the external device and processes the video information so that it can be sequentially read out at a suitable processing speed to record the processed video information onto a suitable medium. Processing may include gradation so that the image can be printed by a recording head onto recording printing paper mechanically conveyed at a predetermined rate.

Problems are caused in conventional picture printing devices when the input video signals represent motion pictures. Printing a still picture frame from motion picture video signals involves using the image data of the two fields which constitute the still picture frame.

In motion picture video signals taken by hand held image pick-up devices, such as 8 mm video cameras, deviations in the picture by unintentional hand movements cause further problems in producing high quality still picture frames from the two fields of data. Conventional picture printing devices do not correct for deviations in the input video signals when a still picture frame is printed, therefore any deviation between the two fields of the picture would be represented in the printed copy of the still picture frame. As a result, the printed picture appears unclear.

OBJECTS AND SUMMARY OF THE INVENTION

It is an object of the present invention to provide picture printing apparatus for printing still picture frames from motion picture video signals, wherein input deviations of the aforementioned type do not affect the quality of the output image.

The picture printing apparatus according to this invention implements motion correction, via motion vectors, between the two image fields which constitute the still picture frame. The motion-corrected still picture frame of the input motion picture video signal is then used to print the image.

In the present invention the motion vectors are input with the video signals from an external device or the motion vectors are detected from the input video signals.

In one embodiment of the invention a still picture frame is printed from externally suggested input motion picture video signals formed of an even field of image data and an odd field of image data which are stored in a memory until a still picture frame mode is set, usually through an external switch. At that time, motion vectors between the even field data and the odd field data are detected so that a deviation, such as hand motion, can be derived. The derived deviation is used to correct the still image frame data so that a motion-corrected image may be printed.

To detect the motion vectors, the frame is divided into N areas. A plurality of correlation values between representative pixels for the two fields in a given area are calculated, and the motion vector is determined from the correlation values. The deviation is determined from the distribution of the motion vectors.

In another embodiment the motion vector information is supplied directly with the input motion picture video signals, from which the deviation is readily determined. Correction is more rapid because the memory need not be accessed twice, first to determine the motion vectors and second to output the still picture frame.

In a further embodiment the still picture frame mode need not be set. Rather the motion vectors are detected between the two stored fields of video signals from which the deviation is determined. The field data is then read out of the memory, corrected by the determined deviation and output to a printing device or display medium.

BRIEF DESCRIPTION OF THE DRAWINGS

FIGS. 4A and 4B represent a picture and the motion vectors derived therefrom.

FIGS. 5A and 5B represent another picture and the motion vectors derived therefrom.

DETAILED DESCRIPTION OF PREFERRED EMBODIMENTS

Figure 1:
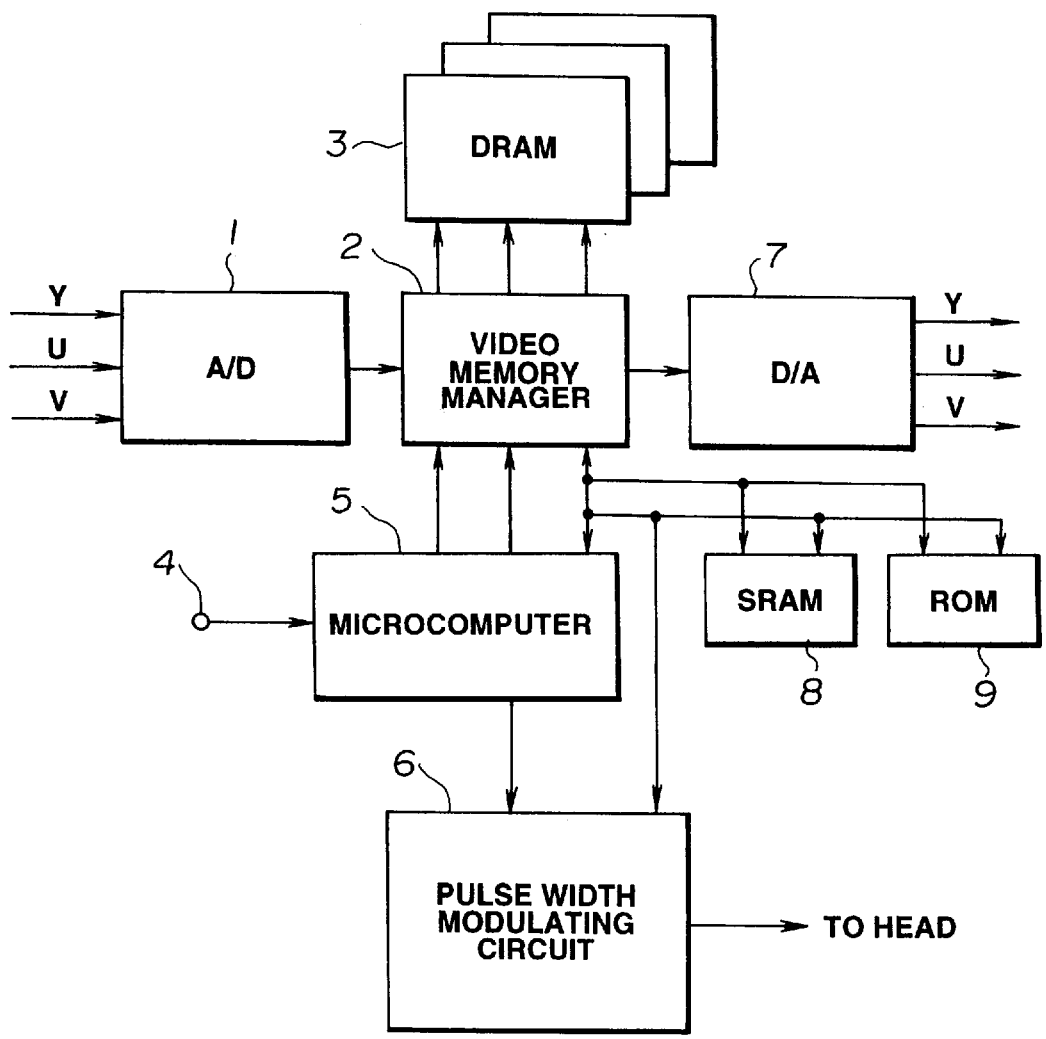
FIG. 1 is a block diagram of picture printing apparatus in accordance with the present invention.

A preferred embodiment of this invention will now be described with reference to the accompanying drawings. An illustration of picture printing apparatus according to the present invention is shown in FIG. 1.

Initially, video signals are generated by an image pickup device (not shown) and undergo signal processing. The luminance signal Y and color difference signals U, V of the video signals are input to an analog-to-digital (A/D) converter 1, where they are converted into digital luminance signals and digital color difference signals, respectively. These digital image signals are supplied to a video memory manager 2 which stores the digital image signals in a plurality of readable and writable dynamic random access memories (DRAMs) 3.

Video memory manager 2 is connected to a microcomputer or processor 5 which has a mode information input terminal 4 to receive mode information (such as a still picture frame mode) determined by a switch (not shown). The mode information determines the operating state of the picture printing apparatus. For example, the apparatus may be set to print a still picture field or to print a still picture frame. Picture drawing color, paint mode picture drawing mode, etc. may be set by the mode information.

A read only memory (ROM) 9 stores predetermined programs for processing the image data and/or controlling the mechanical elements of the picture printing apparatus, such as the printing head and the recording printing paper feed mechanism. Data processed by the programs stored in ROM 9 is stored in a static random access memory (SRAM) 8 which is a readable and writable memory known to those of ordinary skill in the art. The mode information supplied from input terminal 4 is coupled from microcomputer 5 to be stored in SRAM 8.

The picture printing apparatus preferably includes a pulse width modulation circuit 6, which is connected to the printing head. A digital-to-analog converter 7 converts the digital image signals to luminance signal Y and color difference signals U,V for application to a display or monitor. The operation of the picture printing apparatus now will be described in more detail.

Microcomputer 5 applies control signals, such as addresses, based upon the received mode information to ROM 9, reads out a program from ROM 9 corresponding to the mode information and executes the program which has been read out. Microcomputer 5 also applies control signals based on the mode information to SRAM 8 and reads out data from the SRAM to be used in the execution of the program read from ROM 9.

During execution of the program, microcomputer 5 supplies control signals based on the mode information to video memory manager 2. In response to these control signals, the video memory manager reads out the image signals stored in DRAMs 3, which are to be printed. The image signals were stored in the DRAMs by the video memory manager when the signals were input to the picture printing device. The image signals, thus read out, are coupled to microcomputer 5 wherein they are processed as determined by the mode information.

When the mode information indicates a still picture frame printing mode, microcomputer 5 detects motion vectors between the even field image data and the odd field image data, which together constitute the still picture frame to be printed. The microcomputer also derives the deviation between the even field and odd field image data by using the detected motion vectors. The amount of still picture frame correction that may be needed is determined from the derived deviation. Correction data is supplied to video memory manager 2 from the microcomputer. The video memory manager then reads out from DRAMs 3 the stored digital image signals of the even field and the odd field, corresponding to the still picture frame to be printed. As the image signals are read out from the DRAMs, each pixel position is shifted in accordance with the determined deviation correction. The shifted image signals are coupled to pulse width modulating circuit 6 to be printed.

In another embodiment of this invention, the motion vector information between the two fields constituting the still picture frame may be input along with the video signals from the image pickup device (not shown) to the picture printing apparatus of FIG. 1. Here, the motion vector information may be coupled to microcomputer 5 via analog-to-digital converter 1 and video memory manager 2; and when the mode information, indicates a still picture frame printing mode, the motion vector information originally supplied with the video signals is used to derive the deviation between the two fields. Thus, the step of reading the even field data and the odd field data from DRAMs 3 to microcomputer 5 for the purpose of deriving the field deviation is avoided. Nevertheless, as before, the derived deviation is used to determine the amount of correction that is needed; and microcomputer 5 controls video memory manager 2 to read the image signals of even field and odd field from DRAMs 3 in accordance with the determined correction. The pixels of the image data thus read out are shifted as a function of the determined correction and supplied to pulse width modulating circuit 6 to be printed.

The recording system of the picture printing apparatus employs a sublimation type thermal transfer system which contains a thermal head that sublimates the dye ink of color pigment ink paper with heat elements, thereby transferring the dye ink to the recording paper to represent light and shade or gradation of the color image. The quantity of color sublimation is dependent upon the amount of heat (i.e., the heating value) generated by the heat elements, which is controlled by the power value (or energy level) applied to the thermal head. Pulse width modulating circuit 6 responds to the values of the digital image signals which, in turn represent the amplitudes of the received video signals, to vary the time width of a current pulse applied to the thermal head (not shown) to control the energy level applied to the head. Thus, the still picture frame is printed by the thermal head on the recording printing paper to form a hard copy thereof.

The image signals from DRAMs 3 can be used to display a picture on another video device, such as a monitor, and in other output formats. To display the still picture frame on a video device, video memory manager 2 reads out the digital image signals stored in DRAMs 3 in response to read control signals from microcomputer 5, whereupon the image signals are supplied to digital-to-analog (D/A) converter 7 where they are converted into analog signals. These analog signals are output to the display video device as luminance signal Y and color difference signals U,V for displaying the color still picture frame.

Figure 2:
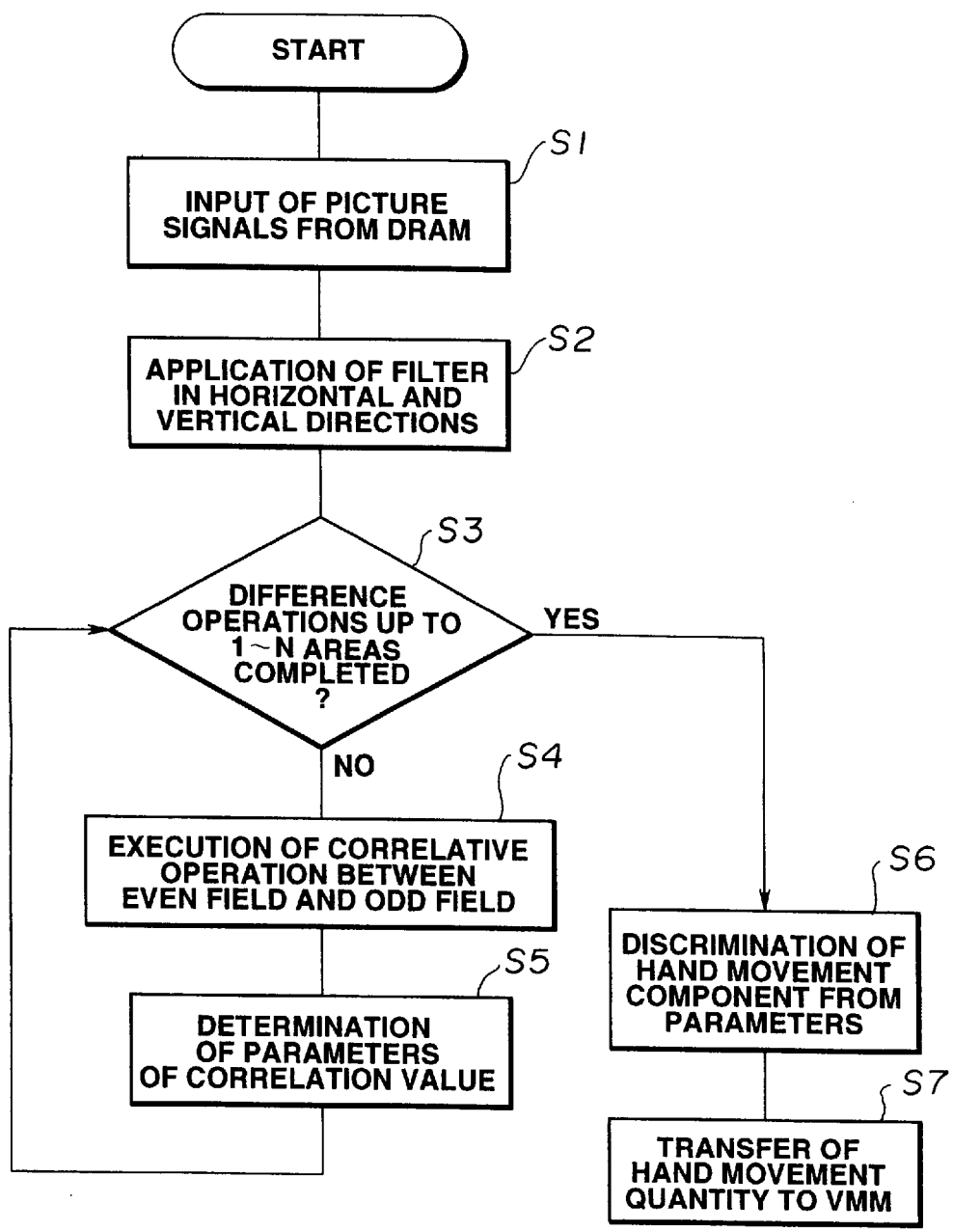
FIG. 2 is a flow chart describing the process of detecting the quantity of hand motion deviation correction that is applied to the output video signals.

The procedure carried out by microcomputer 5 for deriving the deviation between the even and odd fields constituting one frame is shown in the flow chart of FIG. 2 and is described in more detail below.

After the even and odd fields of image signals are stored in DRAMs 3, the microcomputer advances to step S1 to control video memory manager 2 to read digital luminance signal Y of the even field and digital luminance signal Y of the odd field from the DRAMs.

At step S2, the digital luminance signals Y from the even and odd fields are divided into N areas, as described below, and then passed through a band limiting filter which filters the signals in both the horizontal and vertical directions. In the remaining steps of the process, the motion vectors are determined for each of the N divided areas by a representative point matching method, which is described later, though other methods may be used.

At step S3, the difference between the image signals of representative points in the even and odd fields of one divided area is determined. The processing operation then proceeds to step S4 which uses the difference to calculate the correlation value between the two representative points. Then at step S5, parameters are determined in relation to the correlation value, such as minimum value, minimum address, mean value, etc.

The process then returns to step S3, where it is determined whether or not the difference values have been determined with respect to all of the N divided areas. If the difference values have not been determined for all N areas then steps S4 and S5 are carried out on the next divided area. The process repeats until the aforementioned parameters have been determined for all N divided areas.

When the difference values have been determined for all N areas, the processing operation proceeds to step S6, which detects the motion vectors for each respective area based on the parameters determined in steps S3–S5. The motion vectors are then used to discriminate the hand motion component between the even and odd fields, as described below.

At step S7, the hand motion component is transferred to video memory manager 2 as hand motion correction quantities for the horizontal and vertical directions between the even and odd fields of the still picture frame. The video memory manager shifts the positions of the pixels of the image signals read out from DRAMs 3 of the even and odd fields in accordance with the transferred hand motion correction quantities. Thus, the corrected still picture frame data is read out from the DRAMs to be printed.

Determination of the deviation attributed to hand motion will now be described.

When a subject is imaged in a frame it is difficult to distinguish hand motion from actual motion of the subject. Therefore, motion vectors from the background in the frame are used because there is little motion in the background, so motion vectors of the same value in the background result from hand motion. In FIG. 4A, the subject appears in the middle of the frame with background on either side. FIG. 4B schematically represents the motion vectors determined for each of the N divided areas of the frame shown in FIG. 4A. The motion vectors attributed to the subject, in FIG. 4B, are located between motion vectors having the same values. There is a high probability that the motion vectors having the same values represent background motion. Therefore, these motion vectors are determined to be the hand motion deviation component.

There often are frames in which motion vectors having the same value do not exist with the motion vectors attributed to the motion of the subject between them. This occurs, for example, when the subject is to one side of the frame, as shown in FIG. 5A. The motion vector distribution when the subject is positioned along an edge of the frame is shown in FIG. 5B.

Figure 6:
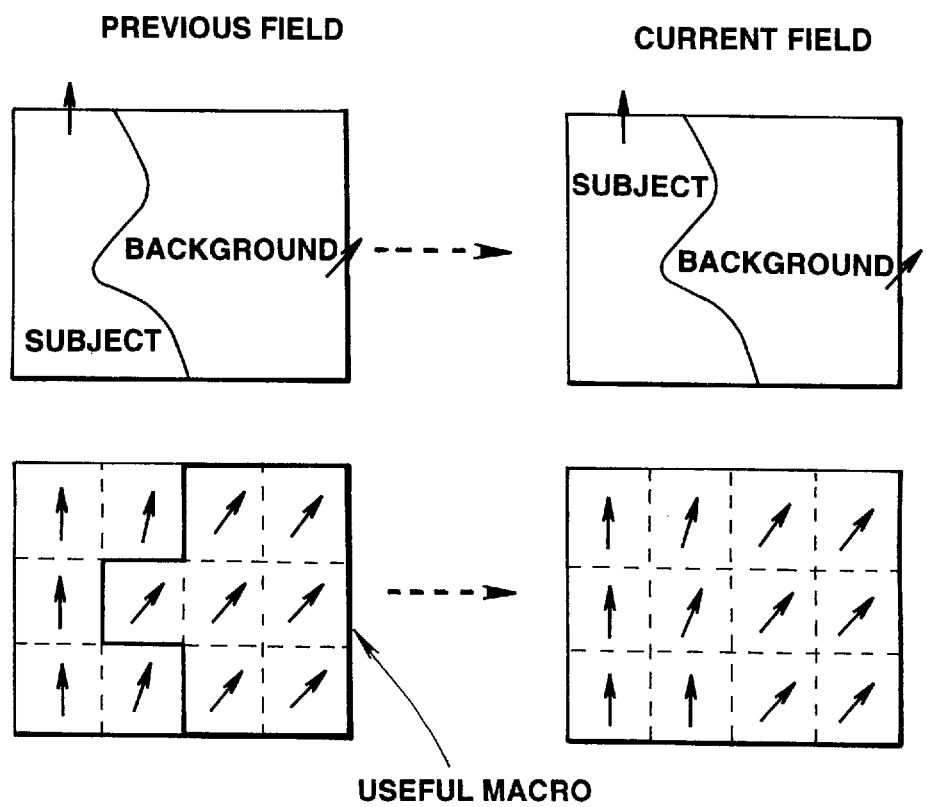
FIG. 6 shows the comparison of the motion vectors derived from two fields constituting a frame.

Within a frame, i.e., from the even field to the odd field, only slight subject movement is present. Therefore blocks, or divided areas, which were derived from the background in the previous field also will be background in the present field. As shown in FIG. 6, there is a high probability that those blocks which represent the background in the previous field also represent the background in the present field. Thus, the motion vectors of given blocks in a frame are examined; and if those blocks in the even and odd fields have motion vectors of the same value they become part of the useful macro. The motion vectors in the useful macro are determined to be representative of background motion and therefore, attributable to hand motion.

The representative point matching technique now will briefly be described.

Figure 3:
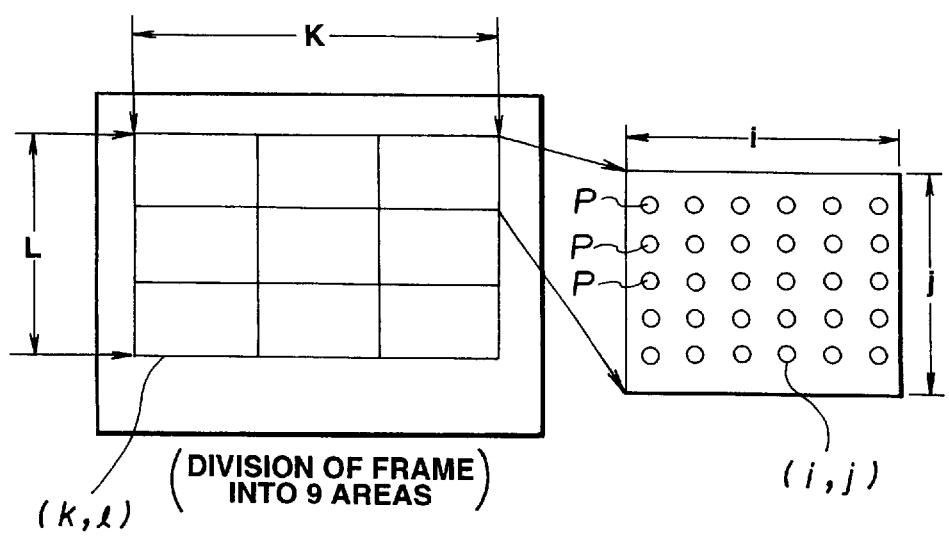
FIG. 3 illustrates the divided areas of a video frame.

Image signals of one frame are divided into a plurality of areas, shown, for example, as 9 areas in FIG. 3. In these 9 areas, there are i representative points P in the horizontal direction and j representative points P in the vertical direction. In the representative point matching process, a correlation value between a representative point in one block of the previous field and representative points from the same block of the current field is determined. In general terms, assuming that each field is formed of K×L blocks, the correlation value $p_{(k,l)}(i,j)$ between value $S^n_{(k,l)}(0, 0)$ of representative point (i,j) included in the (k, l)-th block of the (K×L) blocks in the n-th field and value $S^{n+1}_{(k,l)}(i, j)$ of representative point included in the (k, l)-th block of the (K×L) blocks in the (n+1)-th field is determined by the following equation (1):

$$p_{(k,l)}(i, j) = |S^{n+1}_{(k,l)}(i,j) - S^n_{(k,l)}(0,0)| \quad (1)$$

By cumulative addition of the respective correlation values over all (i,j) points within the (k,l) block, the correlation value P(i, j) of all the pixels within the block is determined. Correlation value P(i, j) of the block is determined by the following equation (2):

$$P(i,j) = \sum_{k=1}^{K} \sum_{l=1}^{L} P_{(k,l)}(i,j) \quad (2)$$

By using the correlation value P(i, j) determined for the block, the motion vector is detected. Motion vectors are determined for each of the K×L blocks by calculating the correlation value p(i, j) for each block and then summing those correlation values.

The detection of motion vectors between an even field and an odd field included in one frame has been described using the representative point matching technique; but it is to be appreciated that various other methods, such as block matching, can also be employed.

In the above described embodiment, the picture printing apparatus of this invention employs a printing device with a sublimation type thermal transfer system. It is to be appreciated that various other printing devices can be used, such as those which realize light and shade or gradation representations of an image, as well as those which cannot realize such gradation representations.

As is clear from the foregoing description, the picture printing apparatus of this invention implements motion correction between images of two fields within a still picture frame so that the motion-corrected still picture frame can be printed. The input video signals, from which the still picture frame is produced, are motion pictures and a hand motion component may be included as part of the input video signals. The present invention detects and corrects for such hand motion. The invention also is adapted to correct for fluctuation of an object, so that the printed still picture frame is clear.

Alternatively, the motion vector information may be input along with the video signals; and in that case, it is possible to detect the hand motion component and carry out signal correction more rapidly because the motion vectors do not have to be determined.

While specific embodiments of the invention have been shown and disclosed, it is to be understood that numerous changes and modifications may be made by those skilled in the art without departing from the scope and intent of the invention.

We claim:

1. A method for outputting image data constituting a frame, comprising the steps of:

receiving digital image data, said digital image data comprising first and second field image data constituting said frame;

storing said digital image data;

detecting at least one motion vector between said stored first field image data and said stored second field image data;

determining a deviation between said first field image data and said second field image data as a function of said at least one motion vector;

shifting, within said frame, pixel positions of said first field image data and said second field image data according to said determined deviation to produce corrected image data; and outputting said corrected image data.

2. A method according to claim 1, wherein said step for outputting comprises printing said corrected image data to form a hard copy of an image.

3. A method according to claim 1, further comprising the steps of:

dividing each of the first and second field image data into a corresponding plurality of areas;

detecting a motion vector for each of the plurality of areas for said first field and said second field, and wherein said step of determining a deviation comprises the steps of:

examining a plurality of detected motion vectors, and determining the deviation in accordance with a distribution of said plurality of motion vectors.

4. A method according to claim 3, wherein the motion vectors have values and wherein said motion vectors having the largest distribution of the same values are determined as said deviation.

5. A method according to claim 3, wherein the step of detecting a motion vector comprises the steps of:

calculating a correlation value between a representative pixel in said first field and a plurality of pixels in said second field;

repeating said step of calculating to provide a plurality of correlation values; and setting the motion vector for an area according to the minimum correlation value among the plurality of correlation values calculated for that area.

6. A method for outputting image data constituting a frame, comprising the steps of:

receiving digital image data, said digital image data comprising first and second field image data constituting said frame, and a plurality of motion vectors representing motion between said first field and said second field;

storing said digital image data;

determining a deviation between said first field image data and said second field image data as a function of said motion vectors;

shifting, within said frame, pixel positions of said first field image data and said second field image data according to said determined deviation to produce corrected image data; and outputting said corrected image data.

7. A method according to claim 6, further comprising the step of dividing each of the first and second field image data into a corresponding plurality of areas, wherein said plurality of motion vectors represent motion of respective ones of said plurality of areas.

8. A method according to claim 7, wherein the step of determining a deviation comprises:

examining a distribution of said plurality of motion vectors; and determining said deviation according to a distribution of said plurality of motion vectors.

9. A method according to claim 8, wherein said plurality of motion vectors have values and wherein the motion vectors having the largest distribution of the same values are determined as said deviation.

10. A method for outputting image data constituting a frame, comprising the steps of:

receiving mode information indicating a particular output state and including frame mode information indicative of the outputting of still image frame data;

receiving digital image data, said digital image data comprising first and second field image data constituting said frame;

storing said digital image data;

detecting motion vectors between said stored first field and said stored second field when said frame mode information is received;

determining a deviation between said first field and said second field as a function of said detected motion vectors;

shifting, within said frame, pixel positions of said first field image data and said second field image data according to said determined deviation to produce corrected image data; and outputting said corrected image data.

11. A picture printing apparatus comprising:

means for receiving digital image data constituting a frame, said digital image data comprising first and second field image data constituting said frame;

memory means for storing said digital image data;

means for detecting at least one motion vector between said stored first field image data and said stored second field image data;

means for determining a deviation between said first field image data and said second field image data as a function of said at least one motion vector;

means for shifting, within said frame, pixel positions of said first field image data and said second field image data stored by said memory means according to said determined deviation to produce corrected image data; and means for outputting said corrected image data.

12. An apparatus according to claim 11, wherein said means for outputting comprises a printing device for printing a hard copy of said corrected image data on a recording medium.

13. An apparatus according to claim 12, wherein said printing device incorporates a sublimation type transfer system.

14. An apparatus according to claim 11, further comprising:

means for dividing each of the first and second field image data into a corresponding plurality of areas;

means for detecting a motion vector for each of the plurality of areas for said first field and said second field;

and wherein said means for determining comprises:

means for examining a plurality of detected motion vectors, and means for determining the deviation in accordance with a distribution of said plurality of motion vectors.

15. An apparatus according to claim 14, wherein the motion vectors have values and wherein said motion vectors having the largest distribution of the same values are determined as said deviation.

16. An apparatus according to claim 14, wherein said means for detecting comprises:

means for calculating a plurality of correlation values, each representing a correlation between a respective representative pixel in said first field and a plurality of pixels in said second field; and means for setting the motion vector for an area according to the minimum correlation value among said plurality of correlation values calculated for that area.

17. A picture printing apparatus comprising:

means for receiving digital image data constituting a frame, said digital image data comprising first and second field image data constituting said frame, and a plurality of motion vectors representing motion between said first field image data and second field image data;

memory means for storing said digital image data;

means for determining a deviation between said first field image data and said second field image data as a function of said plurality of motion vectors;

means for shifting, within said frame, pixel positions of said first field image data and said second field image data stored by said memory means according to said determined deviation to produce corrected image data; and means for outputting said corrected image data.

18. An apparatus according to claim 17, further comprising means for dividing each of the first and second field image data into a corresponding plurality of areas, wherein said plurality of motion vectors represent motion of respective ones of said plurality of areas.

19. An apparatus according to claim 18, wherein said means for determining comprises:

means for examining a distribution of said plurality of motion vectors; and means for determining said deviation according to a distribution of said plurality of motion vectors.

20. An apparatus according to claim 19, wherein the motion vectors have values, and wherein said motion vectors having the largest distribution of the same values are determined as said deviation.

21. A picture printing apparatus comprising:

means for receiving digital image data constituting a frame, said digital image data comprising first and second field image data constituting said frame;

means for receiving mode information indicating a particular output image state and including frame mode information indicative of still image frame data to be output;

memory means for storing said digital image data;

means for detecting motion vectors between said first field and said second field when said still image frame information is received;

means for determining a deviation between said first field and said second field as a function of said detected motion vectors;

means for shifting, within said frame, pixel positions of said first field image data and said second field image data stored by said memory means according to said determined deviation to produce corrected image data; and means for outputting said corrected image data.

* * * * *